UNITED STATES PATENT OFFICE.

KARL J. OECHSLIN, OF PARIS, FRANCE.

ALIPHATIC ACIDS CONTAINING AN ARSENOARYLAMIN GROUP.

1,299,215.   Specification of Letters Patent.   Patented Apr. 1, 1919.

No Drawing.   Application filed March 4, 1915.   Serial No. 12,087.

*To all whom it may concern:*

Be it known that I, KARL JACOB OECHSLIN, citizen of the Swiss Confederation, residing at Paris, in the Republic of France, have invented certain new and useful Improvements in Aliphatic Acids Containing an Arsenoarylamin Group, of which the following is an exact and complete specification.

Arsenophenylglycin is a substance which may be widely employed but its great instability is a considerable disadvantage both in its preparation and use.

I have found that stable derivatives can be obtained by replacing free hydrogen of the secondary amin group by an aliphatic or aromatic acyl group either in the arsenoderivatives or in the arsenious derivatives (—AsO) or the arsinic derivatives (—AsO$_3$H$_2$) with subsequent reduction. These derivatives have the same action as the nonacylated derivatives.

Arsenophenylglycin and its salts become colored very rapidly when exposed to the air but the acylated derivatives are much more stable either when dry or in solution.

Example 1: Warm a solution of 50 grms. of acetylphenylglycinarsinicacid and 500 grms. of sodium-hydrosulfite in 2500 c. c. of water for two hours at 45–55°. Add 70 c. c. of acetic acid. The acetylarsenophenylglycin is precipitated in light yellow flakes which are collected, washed and dried.

Example 2: Dissolve 100 grms. of arsenophenylglycin obtained in the ordinary way in 1000 c. c. of a solution of sodium carbonate (about 8%). Cool the solution to 5° and add gradually with vigorous agitation 100–150 c. c. of acetic anhydrid.

The addition of an excess of hydrochloric acid (10%) produces a light yellow precipitate which on washing and drying appears as a light yellow powder which does not alter in the air.

Instead of acetylating the isolated product, the acetylation can be performed in a manner which will be quite obvious by treating the reduced solution in sodium hydrosulfite with acetic anhydrid.

I declare that what I claim is:

1. As new products of manufacture, the stable N-acylated arsenoaryl derivatives of α-aminoaliphatic acids.

2. As new products of manufacture, the stable N-acetylated arsenoaryl derivatives of α-aminoaliphatic acids.

3. As new products of manufacture N-acetylated arsenophenylglycins.

4. As new products, the stable bodies containing the grouping

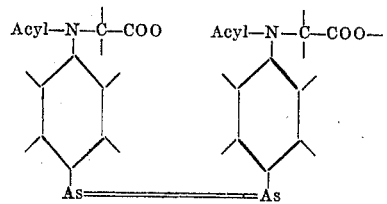

In testimony whereof I have hereunto signed my name this 1st day of February, 1915, in the presence of two subscribing witnesses.

K. J. OECHSLIN.

Witnesses:
　DAVID C. POOLE, Jr.,
　G. HOADLEY.

Copies of this patent may be obtained for five cents each, by addressing the "Commissioner of Patents. Washington, D. C."